United States Patent
Sakamoto et al.

(10) Patent No.: US 7,144,967 B2
(45) Date of Patent: Dec. 5, 2006

(54) ROOM TEMPERATURE FAST-CURABLE SATURATED HYDROCARBON POLYMER COMPOSITION AND DOUBLE-GLAZED GLASS PANE

(75) Inventors: Takafumi Sakamoto, Gunma-ken (JP); Tsuneo Kimura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/820,102

(22) Filed: Apr. 8, 2004

(65) Prior Publication Data
US 2005/0137361 A1   Jun. 23, 2005

(30) Foreign Application Priority Data
Apr. 9, 2003   (JP) .............................. 2003-105637

(51) Int. Cl.
*C08G 77/08* (2006.01)
(52) U.S. Cl. ............................ 528/12; 528/21; 528/35; 524/490
(58) Field of Classification Search .................. 528/12, 528/21, 35; 524/490
See application file for complete search history.

(56) References Cited

U.S. PATENT DOCUMENTS

| | | | | |
|---|---|---|---|---|
| 6,020,450 A | * | 2/2000 | Matsuda et al. | ............... 528/42 |
| 2002/0137869 A1 | * | 9/2002 | Sakamoto et al. | |

FOREIGN PATENT DOCUMENTS

| | | |
|---|---|---|
| EP | 0 566 272 A1 | 10/1993 |
| EP | 0 649 878 A2 | 4/1995 |
| EP | 0 745 604 A2 | 12/1996 |
| JP | 5-279570 A | 10/1993 |
| JP | 11-209701 A | 8/1999 |
| JP | 2001-303024 A | 10/2001 |
| JP | 2001303024 A | 10/2001 |

* cited by examiner

*Primary Examiner*—Robert D. Harlan
(74) *Attorney, Agent, or Firm*—Birch, Stewart, Kolasch & Birch, LLP

(57) ABSTRACT

A room temperature fast-curable saturated hydrocarbon polymer composition comprising (A) a saturated hydrocarbon polymer having at least one hydrolyzable silyl group and a Mn of 500 to 50,000, (B) a β-dicarbonyl compound, and (C) an amino-bearing organic compound, wherein the β-carbonyl group in component (B) is reactive with the amino group in component (C), is dramatically improved in fast-cure and deep-cure capabilities without sacrificing adhesion and electrical properties after water immersion.

11 Claims, No Drawings

ROOM TEMPERATURE FAST-CURABLE SATURATED HYDROCARBON POLYMER COMPOSITION AND DOUBLE-GLAZED GLASS PANE

This Nonprovisional application claims priority under 35 U.S.C. § 119(a) on Patent Application No(s). 2003-105637 filed in JAPAN on Apr. 9, 2003, the entire contents of which are hereby incorporated by reference.

BACKGROUND OF THE INVENTION

1. Technical Field

This invention relates to room temperature fast-curable compositions comprising saturated hydrocarbon polymers as a base polymer, and more particularly, to room temperature fast-curable compositions of the condensation cure type having improved fast-cure and deep-cure capabilities and good water resistance, and double-glazed glass panes using the compositions as a sealant.

2. Background Art

Elastomeric sealing materials are now on widespread use in buildings, vehicles and the like. Sealing materials are used for the purpose of establishing a water or air-tight seal between various members by filling joints or gaps therebetween. It is thus requisite that once applied to joints, window frames or the like, sealing materials cure fast and firmly adhere to various substrates of inorganic materials such as glass, ceramics, metals, cement and mortar and organic materials such as plastics.

For room temperature fast-curable saturated hydrocarbon polymers, a primer composition and a bonding method intended to improve their adhesion are proposed in JP-A 11-209701, but no innovative techniques addressing their cure speed are known. Intending to improve the cure of RTV organopolysiloxane compositions, the inventors previously made research works under the background described below.

Room temperature fast-curable organopolysiloxane compositions of the condensation cure type known in the prior art include one-package compositions in which the amount of a crosslinker is minimized to increase the rate of crosslinking by hydrolysis and two-package compositions in which a crosslinker and a curing agent are separately packed. However, the one-package composition is not regarded as fast-curable because a high speed is available only for curing from the surface and a certain period of time is required for deep curing. The two-package composition is relatively good in deep curing, but is cumbersome to handle because the mixing ratio of two parts is not 1:1, and is thus not compliant with an automatic mixer/dispenser. The amounts of crosslinker and curing agent added must be strictly determined or water must be added as a deep curing agent before the composition can be completely cured to depths. On the other hand, organopolysiloxane compositions of the addition cure type are efficient to work because the mixing ratio of two parts is 1:1, but a heating oven is necessary for curing. In addition, the working environment is restricted since the curing catalysts are poisoned in the presence of addition poisons.

The inventors proposed in JP-A 5-279570 a room temperature fast-curable composition that solved the above-discussed problems. This composition comprises a diorganopolysiloxane or polyoxyalkylene polymer capped with a hydrolyzable silyl group at either end of a molecular chain, an organic compound having at least one carbonyl (C=O) group in a molecule and an organic compound having at least one $NH_2$ group in a molecule, wherein fast-cure and deep-cure capabilities at room temperature are improved by utilizing water formed as by-product by ketimine-forming reaction between C=O and $NH_2$ groups by way of dehydrating condensation. The inventors also proposed in JP-A 2001-303024 to apply the above technology to a room temperature fast-curable saturated hydrocarbon polymer composition.

Continuing the research, however, the inventors found that despite favorable fast-cure and deep-cure capabilities, these compositions have problems with respect to water resistance, typically adhesion in the presence of water and electrical properties after water immersion. Thus the application of these compositions is strictly limited.

It was believed that primary amines left in the cured compositions contribute largely to the above-mentioned decline of water resistance. To solve the problem, the inventors attempted to add an α,β-unsaturated carbonyl compound to the composition for converting a primary amine in the cured composition to a secondary amine, thereby improving water resistance. Adhesion in the presence of water is surely improved, but electrical properties after water immersion still remain problematic, imposing a limit on the application of the composition.

SUMMARY OF THE INVENTION

An object of the invention is to provide a room temperature fast-curable saturated hydrocarbon polymer composition of the condensation cure type having improved fast-cure and deep-cure capabilities at room temperature and exhibiting improved adhesion in the presence of water and improved electrical properties after water immersion, and a double-glazed glass pane using the composition as a sealant.

The inventors have found that by using (A) a saturated hydrocarbon polymer having at least one hydrolyzable silyl group at an end of a backbone and/or an end of a side chain per molecule and with a number average molecular weight in the range of 500 to 50,000 as a base polymer, (B) a carbonyl compound having at least two carbonyl groups per molecule, including one carbonyl group and another carbonyl group located at the β-position relative to the one carbonyl group, and (C) an organic compound having at least one $NH_2$ group per molecule, and selecting components (B) and (C) such that the β-carbonyl group in component (B) is reactive with the $NH_2$ group in component (C), a room temperature curable saturated hydrocarbon polymer composition of the condensation cure type is formulated which has improved fast-cure and deep-cure properties at room temperature and exhibits improved adhesion in the presence of water and improved electrical properties after water immersion.

Accordingly the present invention provides a room temperature fast-curable saturated hydrocarbon polymer composition comprising (A) a saturated hydrocarbon polymer having at least one hydrolyzable silyl group at an end of a backbone and/or an end of a side chain per molecule and with a number average molecular weight in the range of 500 to 50,000, (B) a carbonyl compound having at least two carbonyl groups per molecule, including one carbonyl group and another carbonyl group located at the β-position relative to the one carbonyl group, and (C) an organic compound having at least one $NH_2$ group per molecule, the β-carbonyl group in component (B) being reactive with the $NH_2$ group in component (C).

Also contemplated herein is a double-glazed glass pane using the composition as a sealant.

More particularly, in the composition of the present invention, the β-carbonyl group in component (B) and the $NH_2$ group in component (C) undergo dehydrating condensation reaction, by way of which water is formed in the deep section of the composition. Consequently, the composition is dramatically improved in fast-cure and deep-cure capabilities. Not relying on the concept that water is intentionally incorporated in the composition as a deep section curing agent, the invention effectively overcomes the problems of water separation and inefficient working due to an increased thixotropy of the composition.

More importantly, the dehydrating condensation reaction of the β-carbonyl group with the $NH_2$ group is an irreversible reaction as shown by scheme (1). Therefore, the compound having an $NH_2$ group is never regenerated in the cured composition. Since the composition no longer becomes more hydrophilic than ever, water resistance and electrical properties after water immersion are dramatically improved.

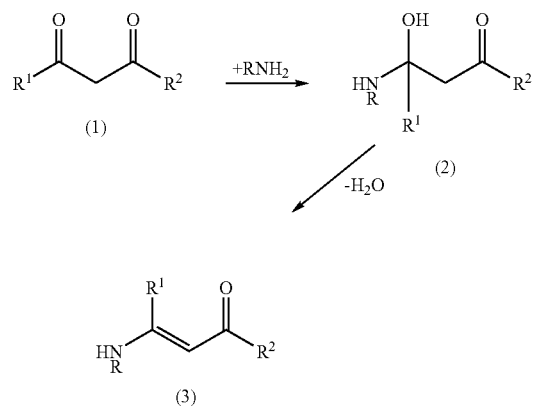

In the scheme, R and $R^1$ each are a monovalent organic group, and $R^2$ is a monovalent organic group or alkoxy group. The organic group may contain a silicon or oxygen atom. Illustrative of R and $R^1$ are the same groups as will be exemplified for $R^3$ later. Illustrative examples of $R^2$ are $R^3$, alkoxy groups, and those groups to which $R^3$ or silicon-containing organo groups are bonded through an oxygen atom, and preferably alkoxy groups and those groups to which $R^3$ or silicon-containing organo groups are bonded through an oxygen atom.

In the above-referred patents JP-A 5-279570 and JP-A 2001-303024, for instance, water is generated by equilibration reaction between a C=O double bond-bearing organic compound and a $NH_2$ group-bearing organic compound. Thus a ketimine compound exists immediately after curing. Since this reaction is reversible, the ketimine compound gradually decomposes in the presence of moisture to regenerate the $NH_2$ group-bearing organic compound. The compound thus regenerated makes the cured composition more hydrophilic, allowing easy penetration of water into the cured composition. As a consequence, the cured composition substantially loses water resistance.

DESCRIPTION OF THE PREFERRED EMBODIMENTS

Component A

Component (A) is a base polymer. Saturated hydrocarbon polymers (exclusive of polyether polymers) are used. It is requisite that the base polymer be capped with a hydrolyzable silyl group at an end of a backbone and/or an end of a side chain. Owing to the presence of hydrolyzable groups, the polymer undergoes hydrolysis and polycondensation in the presence of water, forming a cured product in the form of a rubbery elastomer.

The hydrolyzable silyl group is in the form of a silicon atom having at least one hydrolyzable group attached thereto and is represented by the following formula.

Herein, X is a hydrolyzable group, p is an integer of 1 to 3, and $R^3$ is a substituted or unsubstituted monovalent hydrocarbon group.

Examples of the hydrolyzable group represented by X include carboxyl, ketoxime, alkoxy, alkenoxy, amino, aminoxy and amide groups. The number of hydrolyzable groups attached to a silicon atom is not limited to one, and two or three hydrolyzable groups may be attached to a common silicon atom. To the silicon atom to which one or more hydrolyzable groups are attached, other organic groups may, of course, be attached. Examples of such organic groups ($R^3$) include alkyl groups such as methyl, ethyl, and propyl, cycloalkyl groups such as cyclohexyl, alkenyl groups such as vinyl and allyl, aryl groups such as phenyl and tolyl, and substituted forms of the foregoing groups in which some hydrogen atoms are substituted with halogen atoms or the like, such as chloromethyl and 3,3,3-trifluoropropyl.

The base polymer (A) should have a number average molecular weight in the range of 500 to 50,000, preferably 700 to 20,000, and more preferably 1,000 to 10,000. Outside the range, inconvenient issues arise such as difficulty to form a cured rubber having satisfactory properties and inefficient working.

The base polymers are not particularly limited as long as they are saturated hydrocarbon polymers such as ethylene polymers, propylene polymers and isobutylene polymers. Preferred are polymers having in their backbone a structure of the general formula (2):

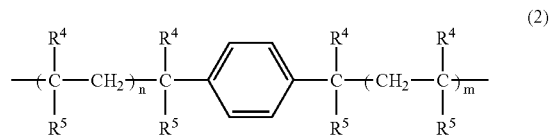

wherein $R^4$ and $R^5$ which may be the same or different are substituted or unsubstituted monovalent hydrocarbon groups, m and n are such positive integers that the polymers have a number average molecular weight in the range of 500 to 50,000. More preferred are polymers having the general formula (3):

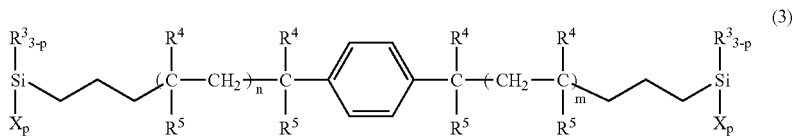

wherein $R^3$ to $R^5$ which may be the same or different are substituted or unsubstituted monovalent hydrocarbon groups, X is a hydrolyzable group as described above, p is an integer of 1 to 3, m and n are positive integers.

Examples of $R^3$ to $R^5$ include the same groups as the organic groups ($R^3$) other than the hydrolyzable groups exemplified for the hydrolyzable silyl group. The subscripts m and n are such positive integers that the saturated hydrocarbon polymers have a desired number average molecular weight.

Component B

Component (B) is a carbonyl compound having at least two carbonyl groups per molecule, including one carbonyl group and another carbonyl group located at the β-position relative to the one carbonyl group. Such a carbonyl compound is referred to as "β-dicarbonyl compound" and the carbonyl group at the β-position is referred to as "β-carbonyl group," hereinafter. This compound reacts with the $NH_2$ group-bearing organic compound as component (C) to generate water, which serves as a curing agent, in the deep section of the composition.

The β-dicarbonyl compound undergoes reaction as shown above by scheme (1). Specifically, it has a molecular structure depicted at circled 1, possessing a moiety in which two carbonyl groups are separated by a carbon atom. Therefore, in order that the β-dicarbonyl compound complete the reaction shown by scheme (1), the carbon atom interposed between two carbonyl groups (i.e., carbon atom at α-position) must not be quaternary, that is, at least one hydrogen atom must be attached to the carbon atom at α-position.

Typical examples of the β-dicarbonyl compound that satisfies the above requirement include, but are not limited to, acetoacetates such as methyl acetoacetate, ethyl acetoacetate, propyl acetoacetate and butyl acetoacetate, diketones such as 2,4-pentanedione, 2,4-hexanedione, and 1,3-cyclohexanedione, and silicon atom-bearing compounds represented by the following formula:

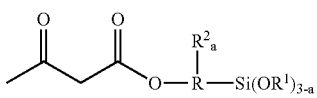

wherein R is a divalent hydrocarbon group, $R^1$ and $R^2$ which may be the same or different are substituted or unsubstituted monovalent hydrocarbon groups, and "a" is 0, 1 or 2, preferably 0 or 1. Illustrative examples of the silicon atom-bearing compounds are shown below.

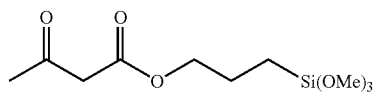

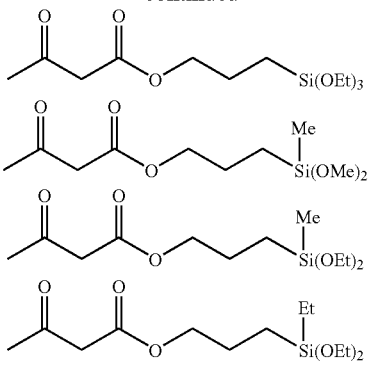

Herein Me is methyl and Et is ethyl.

In addition to the above-mentioned compounds, silane coupling agents, various polymers and oligomers are, of course, useful as long as they contain a moiety having two carbonyl groups separated by a carbon atom as a functional group. These β-dicarbonyl compounds may be used alone or in admixture of two or more. Notably, the β-dicarbonyl compound (B) is preferably a compound having at least one silicon atom.

Component (B) is preferably used in amounts to provide 0.001 to 1 mole, especially 0.01 to 0.1 mole of the β-carbonyl group per 100 g of component (A). Less than 0.001 mole of β-carbonyl group may fail to develop a satisfactory deep cure capability whereas more than 1 mole may produce a cured elastomer having undesirable physical properties.

Component C

Component (C) is an organic compound having at least one $NH_2$ group per molecule, which is referred to as "amino-bearing organic compound," hereinafter. This compound reacts with the β-dicarbonyl compound as component (B) to generate water serving as a curing agent in the deep section of the composition, as previously described.

Any amino-bearing organic compound may be used as long as it has a reactive primary amino group capable of reaction as shown by scheme (1). Illustrative examples include amines such as methylamine, ethylamine, butylamine, ethylenediamine, and aniline, silane coupling agents having a $NH_2$ group as a functional group such as γ-aminopropyltriethoxysilane, and polymers and oligomers having $NH_2$ groups. In the practice of the invention, from the standpoint of steric hindrance during reaction with component (B), it is preferred to use those amino-bearing organic compounds in which the amino group's α-carbon atom is primary or secondary or a member of an aromatic ring. If the α-carbon atom is a tertiary carbon atom as is often the case, its reactivity with a carbonyl group may be low, failing to achieve the desired effect. The amino-bearing organic compounds may be used alone or in admixture of two or more.

Component (C) is preferably used in amounts to provide 0.001 to 1 mole, especially 0.01 to 0.1 mole of the primary amino group per 100 g of component (A). Less than 0.001 mole of primary amino group may fail to develop a satisfactory deep cure capability whereas more than 1 mole may produce a cured elastomer having undesirable physical properties.

Component D

Component (D) is calcium silicate for imparting resin adhesiveness and appropriate rubber physical properties to the inventive composition. Calcium silicate are preferably in particle form having an average particle diameter of 1 to 50 µm, especially 4 to 40 µm. Calcium silica powder with an average particle diameter of less than 1 µm may not be filled to fully high levels, resulting in cured rubber with poor physical properties. Calcium silica powder with an average particle diameter of more than 50 µm may make the surface state of the composition rough, detracting from the outer appearance. Preferred calcium silicate has an oil absorption of 10 to 90 ml/100 g, especially 20 to 80 ml/100 g. With an oil absorption of less than 10 ml/100 g, less reinforcement may be achieved, resulting in cured rubber with poor physical properties. An oil absorption of more than 90 ml/100 g may invite a viscosity buildup which interferes with mixing and dispensing upon application. Further preferably, calcium silicate has been surface treated with silane coupling agents and/or siloxanes prior to use.

Component (D) is preferably added in amounts of 5 to 400 parts by weight, more preferably 10 to 300 parts by weight per 100 parts by weight of component (A). Excessive amounts of component (D) may invite a viscosity buildup which interferes with mixing and dispensing upon application. Less amounts of component (D) may degrade the physical properties of cured rubber.

Component E

Component (E) is calcium carbonate which is surface treated with a fatty acid ester. It imparts storage stability, adhesion and appropriate rubber physical properties to the inventive composition. Suitable calcium carbonate to be surface treated may be either heavy calcium carbonate or colloidal calcium carbonate, with the colloidal calcium carbonate being preferred. The fatty acid esters used as the surface treating agent include polyhydric alcohol fatty acid esters such as glycerin fatty acid esters, alpha-sulfo fatty acid esters, polyoxyethylene sorbitan fatty acid esters, sorbitan fatty acid esters, polyethylene fatty acid esters, and sucrose fatty acid esters. The fatty acid esters used herein may be of either low or high molecular weight.

The surface treated state of calcium carbonate and the amount of fatty acid ester borne need not be particularly limited. It is preferred that a minimum sufficient amount of fatty acid ester to provide storage stability be firmly fixed to surfaces of calcium carbonate particles without being liberated by temperature changes. With respect to the manner of surface treatment, calcium carbonate which has already been surface treated with a fatty acid ester may be used. Alternatively, in the process of preparing the inventive composition, a fatty acid ester may be added along with calcium carbonate whereupon calcium carbonate surfaces are treated with the fatty acid ester during the process.

Component (E) is preferably added in amounts of 5 to 400 parts by weight, more preferably 10 to 300 parts by weight per 100 parts by weight of component (A). Excessive amounts of component (E) may invite a viscosity buildup which interferes with mixing and dispensing upon application. Less amounts of component (E) may degrade the physical properties of cured rubber.

Component F

Component (F) is a compound obtained by combining 1 mole of γ-aminopropyltrimethoxysilane or γ-aminopropyltriethoxysilane with 1.0 to 4.0 moles of γ-glycidoxypropyltrimethoxysilane or γ-glycidoxypropyltriethoxysilane, and heating the mixture at 50° C. for 3 days for ripening. It imparts adhesion, especially under water immersion, to the inventive composition. With respect to adhesion, various silane coupling agents were investigated. It was found that silane coupling agents having a primary and/or secondary amino group were effective in imparting initial adhesion, but silane coupling agents having a primary amino group adversely affected adhesion under water immersion. Then, for quenching primary amino groups, we attempted to premix a silane coupling agent having an acrylic, methacrylic or epoxy group with a silane coupling agent having a primary amino group, and heat the mixture at 50° C. for 3 days for ripening. We have found that an effective compound is obtained when the two reactants are mixed in a molar ratio within the above-described range. If the amount of γ-glycidoxypropyltrimethoxysilane or γ-glycidoxypropyltriethoxysilane is less than 1.0 mole, some primary amino groups are left behind and may adversely affect adhesion under water immersion. If the said amount is more than 4.0 moles, initial adhesion may become poor. The compounds as component (F) may be used alone or in admixture of two or more.

Component (F) is preferably added in amounts of 0.05 to 30 parts by weight, more preferably 0.1 to 20 parts by weight per 100 parts by weight of component (A). Less amounts of component (F) may fail to develop initial adhesion. Excessive amounts of component (F) may degrade the physical properties of cured rubber.

In the inventive composition, various other compounding ingredients may be incorporated as long as they do not inhibit the fast-cure and deep-cure capabilities at room temperature. Suitable ingredients include condensation catalysts such as organic tin esters, organic tin chelate complexes, organic titanate esters, organic titanium chelate complexes, tetramethylguanidylpropyltrimethoxysilane, and tetramethylguanidylpropyltristrimethylsiloxysilane; storage stabilizers such as methyltrimethoxysilane, vinyltrimethoxysilane, tetramethoxysilane, methyltripropenoxysilane, vinyltripropenoxysilane, phenyltripropenoxysilane, methyltributanoximesilane, vinyltributanoximesilane, tetrabutanoximesilane, and methyltriacetoxysilane; reinforcing fillers such as fumed silica, precipitated silica, titanium dioxide, aluminum oxide, quartz flour, carbon powder, talc and bentonite; basic fillers such as calcium carbonate, zinc carbonate, zinc oxide, and magnesium carbonate; fibrous fillers such as asbestos, glass fibers, carbon fibers and organic fibers; colorants such as pigments and dyes; heat resistance improvers such as red iron oxide and cerium oxide; freeze resistance improvers; antirusting agents; adhesion improvers such as γ-glycidoxypropyltriethoxysilane; and liquid reinforcements such as network polysiloxane consisting of triorganosiloxy units and $SiO_2$ units. Any of these ingredients may be added in customary amounts, if necessary.

Additionally, organic solvents, mildew-proof agents, flame retardants, plasticizers, thixotropic agents, tackifiers, cure accelerators, pigments and the like may be added insofar as the objects of the invention are not compromised. Suitable plasticizers include hydrocarbon compounds such as polybutene, hydrogenated polybutene, liquid polybutadiene, hydrogenated polybutadiene, paraffin oil, and naphthenic oil, chlorinated paraffins, phthalates such as dibutyl phthalate and di(2-ethylhexyl) phthalate, non-aromatic dibasic acid esters such as dioctyl adipate and dioctyl sebacate, esters of polyalkylene glycols, and phosphoric acid esters such as tricresyl phosphate.

Curable Composition

The inventive composition is generally formulated as a one-package room temperature fast-curable composition by intimately mixing amounts of the above-mentioned components (A) to (F) and optional compounding ingredients in a dry atmosphere. To insure storage stability, the one-package room temperature fast-curable composition may have a microcapsulated form of component (B) or (C) compounded therein, or the components may be formulated as a two-package composition wherein two parts are mixed together prior to use. The two-package composition permits two parts to be mixed at 1:1.

Components (B) and (C) are important for the inventive composition because they react with each other as shown by scheme (1) to produce water serving as a deep curing agent. In the practice of the invention, components (B) and (C) are, of course, selected such that such reaction may quickly take place. Various compounding ingredients which are optionally used should also be selected so as not to inhibit the production of water.

The inventive composition cures in the presence of airborne moisture and at the same time, water is produced in the deep section. Then not only surface cure, but also deep cure take place. Therefore, both fast-cure and deep-cure capabilities are dramatically improved. In the embodiment of a two-package composition wherein two parts are mixed on use, the invention ensures that the components are divided into two parts to be mixed at 1:1. A further advantage is the ease of practical implementation because both components (B) and (C) are readily available.

Due to fast-cure and deep-cure capabilities, the inventive composition is suited as automotive oil sealing materials and sealing and potting materials for electric and electronic parts which must meet a recent demand for further simplification of process.

The inventive composition can find other applications because of low gas permeability, water resistance and moisture resistance. The composition is highly suited in applications as coating materials requiring water resistance such as ship bottom paint, power plant sea water inlet pipe paint, and fishnet paint, moisture-proof coating materials requiring moisture resistance as used for LCD and PDP, adhesive seals between conductor and resin coating, adhesive seals between a resin case or connector and conductor, adhesive seals in vacuum or pressure chambers, and the like.

In building applications where air-tightness, moisture resistance and/or water resistance is necessary, the invention composition can be advantageously used as adhesive seals between rubber gasket and glass, joint seals for double-glazed glass panes, adhesive seals between juncture sides or edges of water-proof sheet, adhesive seals between solar water panel and roofing water-proof sheet, adhesive seals between solar cell panel and roofing, surface adhesives between siding panel and building wall, and the like. It is also applicable as adhesive seals between glass plates or transparent resin plates and window frames in meters, instruments or the like.

In particular, the inventive composition is best suited as a sealant for double-glazed glass panes. Double-glazed glass panes using the inventive composition as a sealant are improved in heat insulation efficiency.

EXAMPLE

Examples of the invention are given below by way of illustration, but not by way of limitation. In the Examples, the viscosity is a measurement at 23° C. Me denotes methyl, Mn is a number average molecular weight, Mw is a weight average molecular weight, and Mw/Mn is a dispersity.

Comparative Example 1

A curable composition was prepared by mixing 150 g of a mixture of a saturated hydrocarbon polymer of the formula (4) below (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 3.0 g of dibutyltin dilaurate, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), and 10 g of fumed silica (trade name Aerosil R-972 by Nippon Aerosil Co., Ltd.) in a dry state.

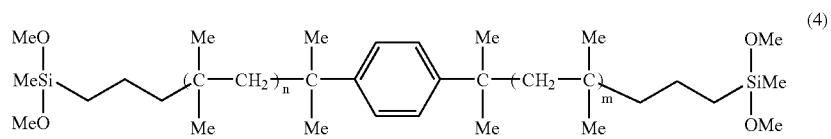

(4)

(The subscripts m and n are such numbers as to provide Mn=5,800.)

The composition was formed into a sheet of 2 mm thick, which was allowed to stand in a 23° C./50% RH atmosphere for one hour. It did not become a rubber elastomer and rubber physical properties could not be examined. Separately, the composition was poured into a glass cylinder having a diameter of 20 mm and a height of 100 mm and allowed to cure in a 23° C./50% RH atmosphere for 24 hours. At the end of curing, the glass cylinder was broken to take out the cured composition. The portion that became a rubbery elastomer was measured to have a thickness of 0.5 mm.

Comparative Example 2

A curable composition was prepared by mixing 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), 10 g of fumed silica (trade name Aerosil R-972 by Nippon Aerosil Co., Ltd.), 2.90 g (0.05 mole) of acetone, 6.45 g (0.05 mole) of n-butylamine, and 3.0 g of dibutyltin dilaurate in a dry state.

The composition was formed into a sheet of 2 mm thick, which was allowed to stand in a 23° C./50% RH atmosphere for one hour, obtaining a rubber elastomer. Rubber physical properties were examined according to JIS K-6249, with the results shown in Table 1. A rubber elastomer as cured for 24 hours under the above-mentioned conditions was immersed in water at 50° C. for 7 days, after which rubber physical properties were examined according to JIS K-6249. The results are also shown in Table 1. Separately, the composition was cured in a glass cylinder as in Comparative Example 1. The portion that became a rubbery elastomer was measured to have a thickness of 100 mm.

Comparative Example 3

A curable composition was prepared by mixing 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), 10 g of fumed silica (trade name Aerosil R-972 by Nippon Aerosil Co., Ltd.), 7.35 g (0.05 mole) of cyclohexanone, 7.45 g (0.05 mole) of cyclohexylamine, and 3.0 g of dibutyltin dilaurate in a dry state.

As in Comparative Example 2, the composition was cured into a rubber elastomer, and its physical properties were examined. The results are shown in Table 1. Separately, the composition was cured in a glass cylinder as in Comparative Example 1. The portion that became a rubbery elastomer was measured to have a thickness of 100 mm.

Example 1

A curable composition was prepared by mixing 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), 10 g of fumed silica (trade name Aerosil R-972 by Nippon Aerosil Co., Ltd.), 6.5 g (0.05 mole) of ethyl acetoacetate, 9.0 g (0.05 mole) of γ-aminopropyltrimethoxysilane, and 3.0 g of dibutyltin dilaurate in a dry state.

As in Comparative Example 2, the composition was cured into a rubber elastomer, and its physical properties were examined. The results are shown in Table 1. Separately, the composition was cured in a glass cylinder as in Comparative Example 1. The portion that became a rubbery elastomer was measured to have a thickness of 100 mm.

Example 2

A curable composition was prepared as in Example 1 except that 13.2 g (0.05 mole) of a compound shown below was used instead of 6.5 g of ethyl acetoacetate.

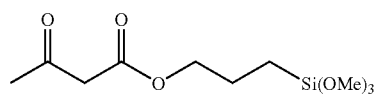

As in Comparative Example 2, the composition was cured into a rubber elastomer, and its physical properties were examined. The results are shown in Table 1. Separately, the composition was cured in a glass cylinder as in Comparative Example 1. The portion that became a rubbery elastomer was measured to have a thickness of 100 mm.

Comparative Example 4

A curable composition was prepared by mixing 150 g of a mixture of a saturated hydrocarbon polymer of the formula (5) below (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 1.0 g of tetramethylguanidylpropyltrimethoxysilane, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), and 10 g of fumed silica (trade name Aerosil R-972 by Nippon Aerosil Co., Ltd.) in a dry state.

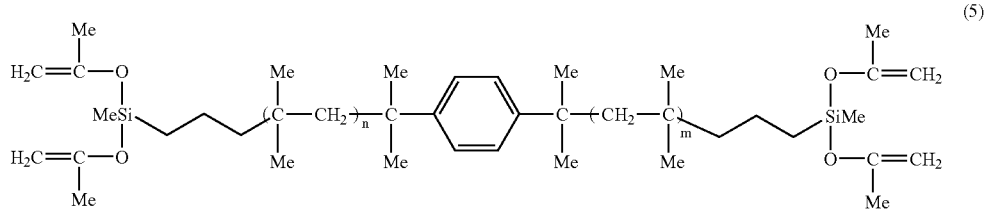

(5)

(The subscripts m and n are such numbers as to provide Mn=5,800.)

The composition was formed into a sheet of 2 mm thick, which was allowed to stand in a 23° C./50% RH atmosphere for one hour. It did not become a rubber elastomer and rubber physical properties could not be examined. Separately, the composition was poured into a glass cylinder having a diameter of 20 mm and a height of 100 mm and allowed to cure in a 23° C./50% RH atmosphere for 24 hours. At the end of curing, the glass cylinder was broken to take out the cured composition. The portion that became a rubbery elastomer was measured to have a thickness of 0.6 mm.

Comparative Example 5

A curable silicone rubber composition was prepared by mixing 150 g of a mixture of a saturated hydrocarbon polymer of the formula (5) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 2.90 g (0.05 mole) of acetone, 6.45 g (0.05 mole) of n-butylamine, 1.0 g of tetramethylguanidylpropyltrimethoxysilane, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), and 10 g of fumed silica (trade name Aerosil R-972 by Nippon Aerosil Co., Ltd.) in a dry state.

As in Comparative Example 2, the composition was cured into a rubber elastomer, and its physical properties were examined. The results are shown in Table 2. Separately, the composition was cured in a glass cylinder as in Comparative Example 1. The portion that became a rubbery elastomer was measured to have a thickness of 100 mm.

Comparative Example 6

A curable silicone rubber composition was prepared by mixing 150 g of a mixture of a saturated hydrocarbon polymer of the formula (5) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 7.35 g (0.05 mole) of cyclohexanone, 7.45 g (0.05 mole) of cyclohexylamine, 1.0 g of tetramethylguanidylpropyltrimethoxysilane, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), and 10 g of fumed silica (trade name Aerosil R-972 by Nippon Aerosil Co., Ltd.) in a dry state.

As in Comparative Example 2, the composition was cured into a rubber elastomer, and its physical properties were examined. The results are shown in Table 2. Separately, the composition was cured in a glass cylinder as in Comparative Example 1. The portion that became a rubbery elastomer was measured to have a thickness of 100 mm.

Example 3

A curable silicone rubber composition was prepared by mixing 150 g of a mixture-of a saturated hydrocarbon polymer of the formula (5) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 7.9 g (0.05 mole) of butyl acetoacetate, 11.05 g (0.05 mole) of γ-aminopropyltriethoxysilane, 1.0 g of tetramethylguanidylpropyltrimethoxysilane, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), and 10 g of fumed silica (trade name Aerosil R-972 by Nippon Aerosil Co., Ltd.) in a dry state.

As in Comparative Example 2, the composition was cured into a rubber elastomer, and its physical properties were examined. The results are shown in Table 2. Separately, the composition was cured in a glass cylinder as in Comparative Example 1. The portion that became a rubbery elastomer was measured to have a thickness of 100 mm.

TABLE 1

|  |  | Comparative Example | | | Example | |
|---|---|---|---|---|---|---|
|  |  | 1 | 2 | 3 | 1 | 2 |
| Initial | Hardness, Durometer A | UM | 16 | 17 | 20 | 23 |
|  | Elongation at break, % | UM | 550 | 520 | 600 | 580 |
|  | Tensile strength, MPa | UM | 0.95 | 1.05 | 1.40 | 1.50 |
| After water immersion | Hardness, Durometer A | — | 4 | 6 | 19 | 23 |
|  | Elongation at break, % | — | 200 | 220 | 610 | 590 |
|  | Tensile strength, MPa | — | 0.15 | 0.23 | 1.35 | 1.48 |

UM: unmeasurable

TABLE 2

|  |  | Comparative Example | | | Example 3 |
|---|---|---|---|---|---|
|  |  | 4 | 5 | 6 |  |
| Initial | Hardness, Durometer A | UM | 18 | 20 | 24 |
|  | Elongation at break, % | UM | 500 | 510 | 450 |
|  | Tensile strength, MPa | UM | 1.01 | 1.02 | 1.80 |
| After water immersion | Hardness, Durometer A | — | 6 | 8 | 24 |
|  | Elongation at break, % | — | 170 | 180 | 500 |
|  | Tensile strength, MPa | — | 0.18 | 0.26 | 1.77 |

UM: unmeasurable

Each of the curable compositions prepared in Examples 1 and 3 and Comparative Examples 3 and 6 was formed into a sheet of 1 mm thick, which was allowed to stand in a 23° C./50% RH atmosphere for 24 hours. The cured sheet was measured for electrical properties at the initial and after 24 hour immersion in water at 20° C. according to JIS C-2123. The 15 results are shown in Table 3.

TABLE 3

|  |  | Volume resistivity ($\Omega \cdot cm$) |
|---|---|---|
| Example 1 | Initial | $4.0 \times 10^{11}$ |
|  | After water immersion | $3.5 \times 10^{10}$ |
| Example 3 | Initial | $2.0 \times 10^{11}$ |
|  | After water immersion | $1.0 \times 10^{10}$ |
| Comparative Example 3 | Initial | $2.0 \times 10^{11}$ |
|  | After water immersion | Unmeasurable |
| Comparative Example 6 | Initial | $1.0 \times 10^{11}$ |
|  | After water immersion | Unmeasurable |

It is seen from the data of Table 3 that the cured sheets obtained from the inventive compositions (Examples 1 and 3) have electrical properties which are kept stable (or little changed from the initial) even after water immersion.

Comparative Example 7

A curable composition was prepared by mixing 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 75 g of fatty acid-treated light calcium carbonate (trade name Calex 300 by Maruo Calcium Co. Ltd.), 75 g of heavy calcium carbonate (trade name Softon 1500 by Shiraishi Calcium K.K.), 10 g of fumed silica (trade name Aerosil R-972 by Nippon Aerosil Co., Ltd.), 7.35 g (0.05 mole) of cyclohexanone, 7.45 g (0.05 mole) of cyclohexylamine, 3.0 g of dibutyltin dilaurate and 18.0 g (0.1 mole) of γ-aminopropyltrimethoxysilane in a dry state.

As in Comparative Example 2, the composition was cured into a rubber elastomer, and its physical properties were examined. The results are shown in Table 4. Separately, the composition was cured in a glass cylinder as in Comparative Example 1. The portion that became a rubbery elastomer was measured to have a thickness of 100 mm.

Example 4

A curable composition was prepared by mixing 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 150 g of calcium silicate (NYAD G by NYCO'S VERSATILE MINERAL, average particle diameter 40 μm, oil absorption 45 ml/100 g), 6.5 g (0.05 mole) of ethyl acetoacetate, 9.0 g (0.05 mole) of γ-aminopropyltrimethoxysilane, and 3.0 g of dibutyltin dilaurate in a dry state.

As in Comparative Example 2, the composition was cured into a rubber elastomer, and its physical properties were examined. The results are shown in Table 4. Separately, the composition was cured in a glass cylinder as in Comparative Example 1. The portion that became a rubbery elastomer was measured to have a thickness of 100 mm.

Example 5

A curable composition was prepared by mixing 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 150 g of fatty acid ester-treated light calcium carbonate (trade name Sealets 500 by Maruo Calcium Co., Ltd.), 6.5 g (0.05 mole) of ethyl acetoacetate, 9.0 g (0.05 mole) of γ-aminopropyltrimethoxysilane, and 3.0 g of dibutyltin dilaurate in a dry state.

As in Comparative Example 2, the composition was cured into a rubber elastomer, and its physical properties were examined. The results are shown in Table 4. Separately, the composition was cured in a glass cylinder as in Comparative Example 1. The portion that became a rubbery elastomer was measured to have a thickness of 100 mm. It is seen that the inventive composition is improved in deep cure.

Example 6

A curable composition was prepared by mixing, in a dry state, 150 g of a mixture of a saturated hydrocarbon polymer of the formula (4) (Mn=5,800, Mw/Mn=1.21) and a paraffinic process oil (trade name Diana Process Oil PS-32 by Idemitsu Kosan Co., Ltd.) as hydrocarbon plasticizer in a weight ratio of 2:1, 150 g of calcium silicate (NYAD G by NYCO'S VERSATILE MINERAL, average particle diameter 40 μm, oil absorption 45 ml/100 g), 6.5 g (0.05 mole) of ethyl acetoacetate, 9.0 g (0.05 mole) of γ-aminopropyltrimethoxysilane, 3.0 g of dibutyltin dilaurate, and 18 g of the compound obtained by heating 1 mole of γ-aminopropyltrimethoxysilane and 2 moles of γ-glycidoxypropyltrimethoxysilane at 50° C. for 3 days for ripening.

As in Comparative Example 2, the composition was cured into a rubber elastomer, and its physical properties were examined. The results are shown in Table 4. Separately, the composition was cured in a glass cylinder as in Comparative Example 1. The portion that became a rubbery elastomer was measured to have a thickness of 100 mm. It is seen that the inventive composition is improved in deep cure.

Each of the curable compositions prepared in Examples 4 to 6 and Comparative Example 7 was cast on float glass to form a simple adhesion test specimen, which was cured in an atmosphere of 23±2° C. and 50±5% RH for 7 days. Initial adhesion (percent cohesive failure) was measured at this point. The specimen was immersed in a thermostat water tank at 55° C. for 50 days, after which adhesion after water immersion was examined.

TABLE 4

|  | Comparative Example | Example | | |
|---|---|---|---|---|
|  | 7 | 4 | 5 | 6 |
| Initial |  |  |  |  |
| Hardness, Durometer A | 18 | 25 | 22 | 25 |
| Elongation at break, % | 550 | 550 | 620 | 560 |
| Tensile strength, MPa | 1.10 | 2.00 | 1.80 | 2.05 |
| After water immersion |  |  |  |  |
| Hardness, Durometer A | 4 | 24 | 23 | 25 |
| Elongation at break, % | 200 | 560 | 680 | 550 |
| Tensile strength, MPa | 0.21 | 1.90 | 1.75 | 2.00 |
| Initial |  |  |  |  |
| Simple adhesion, CF % | 80 | 90 | 90 | 100 |
| After water immersion |  |  |  |  |
| Simple adhesion, CF % | 0 | 80 | 70 | 100 |

Comparative Example 8

A curable composition was prepared by mixing 150 g of a trimethoxysilyl end-capped dimethyl polymer having a viscosity of 20,000 centipoise at 25° C., 75 g of colloidal light calcium carbonate (trade name MT-100 by Maruo Calcium Co., Ltd.), 75 g of heavy calcium carbonate (trade name Softon 1500 by Shiraishi Calcium K.K.), 10 g of fumed silica (trade name Aerosil R-972 by Nippon Aerosil Co., Ltd.), 6.5 g (0.05 mole) of ethyl acetoacetate, 9.0 g (0.05 mole) of γ-aminopropyltrimethoxysilane, and 3.0 g of dibutyltin dilaurate in a dry state.

Each of the curable compositions prepared in Examples 1 and 3 and Comparative Example 8 was formed into a sheet of 2 mm thick, which was allowed to stand in a 23° C./50% RH atmosphere for 24 hours. The cured sheet of 2 mm thick was measured for water vapor permeability according to JIS Z-0208, using a full automatic water vapor permeability tester L80-4000H model. The results are shown in Table 5.

TABLE 5

| | Water vapor permeability (g/m² · day) |
|---|---|
| Example 1 | 1 |
| Example 3 | 1 |
| Comparative Example 8 | 40 |

It is seen from the data of Table 5 that the cured products of the inventive compositions (Examples 1 and 3) are least permeable to water vapor and exhibit better sealing performance.

It is evident that the room temperature curable composition of the condensation cure type comprising a saturated hydrocarbon polymer as a base polymer according to the invention is dramatically improved in fast-cure and deep-cure capabilities without sacrificing adhesion and electrical properties after water immersion.

Japanese Patent Application No. 2003-105637 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature fast-curable saturated hydrocarbon polymer composition comprising
   (A) a saturated hydrocarbon polymer having at least one hydrolyzable silyl group at an end of a backbone and/or an end of a side chain per molecule and with a number average molecular weight in the range of 500 to 50,000,
   (B) a carbonyl compound having at least two carbonyl groups per molecule, including one carbonyl group and another carbonyl group located at the β-position relative to the one carbonyl group, wherein the carbonyl compound (B) is at least one selected from the group consisting of acetoacetates, diketones, and silicon atom-bearing compounds represented by the following formula:

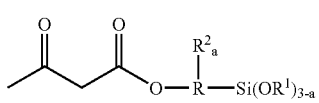

wherein R is a divalent hydrocarbon group, R¹ and R² which may be the same or different are substituted or unsubstituted monovalent hydrocarbon groups, and "a" is 0, 1 or 2, and (C) an organic compound having at least one NH₂ group per molecule,
   the β-carbonyl group in component (B) being reactive with the NH₂ group in component (C) so that the dehydrating condensation reaction of the β-carbonyl group with NH₂ group is an irreversible reaction.

2. The composition of claim 1 wherein components (B) and (C) are present in amounts to provide 0.001 to 1 mole of the β-carbonyl group and 0.001 to 1 mole of the NH₂ group per 100 g of component (A), respectively.

3. The composition of claim 1 wherein component (B) is a compound having at least one silicon atom.

4. The composition of claim 1, further comprising (D) 5 to 400 parts by weight of calcium silicate per 100 parts by weight of component (A).

5. The composition of claim 1, further comprising (E) 5 to 400 parts by weight of calcium carbonate surface treated with a fatty acid ester per 100 parts by weight of component (A).

6. The composition of claim 1, further comprising per 100 parts by weight of component (A), (F) 0.05 to 30 parts by weight of a compound obtained by combining 1 mole of γ-aminopropyltrimethoxysilane or γ-aminopropyltriethoxysilane with 1 to 4 moles of γ-glycidoxypropyltrimethoxysilane or γ-glycidoxypropyltriethoxysilane, and heating for ripening.

7. A double-glazed glass pane using the composition of claim 1 as a sealant.

8. The composition of claim 1 wherein the saturated hydrocarbon polymer (A) has in the backbone a structure of the general formula (2):

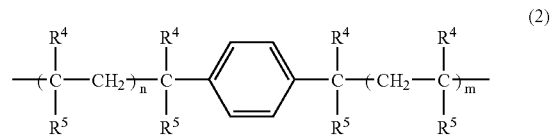

wherein R⁴ and R⁵ which may be the same or different are substituted or unsubstituted monovalent hydrocarbon groups, m and n are such positive integers that the polymers have a number average molecular weight in the range of 500 to 50,000 .

9. The composition of claim 8 wherein the saturated hydrocarbon polymer (A) has the following general formula:

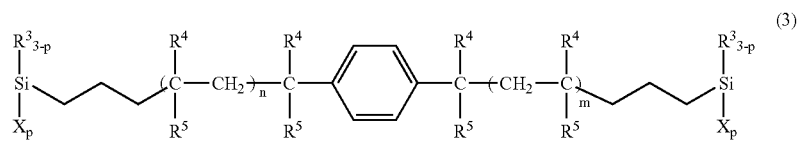

wherein R³ to R⁵ which may be the same or different are substituted or unsubstituted monovalent hydrocarbon groups, X is a hydrolyzable group, p is an integer of 1 to 3, m and n are positive integers as defined above.

10. The composition of claim 1 wherein the carbonyl compound (B) is at least one selected from the group consisting of methyl acetoacetate, ethyl acetoacetate, propyl acetoacetate, butyl acetoacetate, 2,4-pentanedione, 2,4-hexanedione, 1,3cyclohexanedione, and silicon atom-bearing compounds shown below:

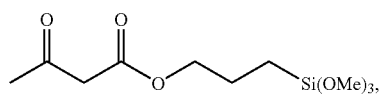
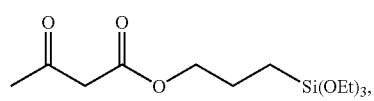
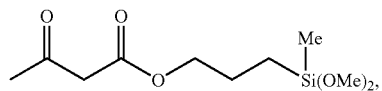
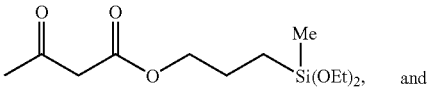
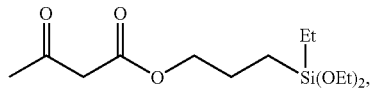
wherein Me is methyl and Et is ethyl.
11. The composition of claim 1 wherein the amino-bearing organic compound is one in which the α-carbon atom of the amino group is primary or secondary or a member of an aromatic ring.
* * * * *